United States Patent
Kapuria et al.

(10) Patent No.: US 10,525,879 B2
(45) Date of Patent: Jan. 7, 2020

(54) METHOD AND SYSTEM FOR VEHICLE STATUS BASED ADVANCED DRIVER ASSISTANCE

(71) Applicant: The Hi-Tech Robotic Systemz Ltd., Gurugram (IN)

(72) Inventors: Anuj Kapuria, Gurugram (IN); Ritukar Vijay, Gurugram (IN)

(73) Assignee: The Hi-Tech Robotic Systemz Ltd, Gurugram (IN)

( * ) Notice: Subject to any disclaimer, the term of this patent is extended or adjusted under 35 U.S.C. 154(b) by 0 days.

(21) Appl. No.: 15/592,670

(22) Filed: May 11, 2017

(65) Prior Publication Data

US 2018/0257560 A1    Sep. 13, 2018

(51) Int. Cl.
| | |
|---|---|
| *B60R 11/04* | (2006.01) |
| *B60Q 9/00* | (2006.01) |
| *B60W 50/14* | (2012.01) |
| *B60W 50/16* | (2012.01) |
| *B60R 1/00* | (2006.01) |
| *G07C 5/12* | (2006.01) |
| *G08B 7/06* | (2006.01) |
| *B60W 50/00* | (2006.01) |
| *G01S 17/08* | (2006.01) |
| *H04L 12/40* | (2006.01) |

(52) U.S. Cl.
CPC ................ *B60Q 9/00* (2013.01); *B60R 1/00* (2013.01); *B60W 50/14* (2013.01); *B60W 50/16* (2013.01); *G07C 5/12* (2013.01); *G08B 7/06* (2013.01); *B60R 2300/105* (2013.01); *B60R 2300/80* (2013.01); *B60R 2300/8093* (2013.01); *B60W 2050/0089* (2013.01); *B60W 2050/143* (2013.01); *B60W 2050/146* (2013.01); *B60W 2420/42* (2013.01); *B60W 2420/52* (2013.01); *B60W 2510/0208* (2013.01); *B60W 2510/0657* (2013.01); *B60W 2510/0666* (2013.01); *B60W 2510/18* (2013.01); *B60W 2510/20* (2013.01); *B60W 2520/06* (2013.01); *B60W 2530/00* (2013.01); *B60W 2540/22* (2013.01); *B60W 2540/26* (2013.01); *B60W 2540/28* (2013.01); *G01S 17/08* (2013.01); *H04L 2012/40215* (2013.01)

(58) Field of Classification Search
CPC .......... B60R 2300/105; G06K 9/00791; G06K 9/00798; G06K 9/00805
USPC ........................................................ 340/937
See application file for complete search history.

(56) References Cited

U.S. PATENT DOCUMENTS 9,815,449 B2 *  11/2017  Inoue .................... B60W 10/20
9,827,811 B1 *  11/2017  McNew ................... B60N 2/90
(Continued)

*Primary Examiner* — Kevin Kim

(57) ABSTRACT

The present invention provides a method and system of historical reaction based driver advanced assistance. In this method, a combination of external environment to a vehicle on which the advanced driver assistance system (ADAS) is mounted fetched by forward looking cameras is combined with rear looking camera for internal environment or driver state, is generated. The generated combination is utilized to analyze is there is any critical situation that is upcoming. For providing feedback for such situation, processor within the ADAS fetches current vehicle state by utilizing multiple parameters stored within a storage. The intensity of the feedback is varied upon the current vehicle state of the vehicle.

14 Claims, 8 Drawing Sheets

(56) References Cited

U.S. PATENT DOCUMENTS

| | | | |
|---|---|---|---|
| 2003/0191573 A1* | 10/2003 | Beyer | B60T 8/17555 |
| | | | 701/70 |
| 2014/0372020 A1* | 12/2014 | Stein | G01C 21/3602 |
| | | | 701/410 |
| 2017/0158054 A1* | 6/2017 | Munaoka | B60K 28/066 |
| 2017/0305440 A1* | 10/2017 | Oba | B60W 50/082 |
| 2017/0361769 A1* | 12/2017 | Bish | G08G 1/166 |
| 2017/0364082 A1* | 12/2017 | Taieb | G05D 1/0219 |
| 2018/0062988 A1* | 3/2018 | Sikaria | H04L 45/66 |
| 2018/0107507 A1* | 4/2018 | Lin | G06F 9/4881 |

* cited by examiner

METHOD AND SYSTEM FOR VEHICLE STATUS BASED ADVANCED DRIVER ASSISTANCE

TECHNICAL FIELD

This invention relates to an advanced driver assistance system (ADAS) and more particularly to an ADAS utilizing a vehicle state to provide appropriate intensity warning to driver of the vehicle.

BACKGROUND OF THE INVENTION

Driver assistance systems are being widely used these days in vehicles. These systems help a driver to be attentive to the road by providing various kinds of information to the driver of the vehicle. Typically, such systems are in-built to the vehicle and vary from vehicle to vehicle. There are various ways in which the driver assistance systems help driver of the vehicle. In one such way, the driver assistance systems are equipped with front looking cameras that identify approaching situations. Then, a corrective action is taken in such situation.

Another type of driver assistance systems utilizes a driver state monitoring camera in addition to the forward-looking cameras. Data from both the modules is fused together and a warning is provided based on predictive danger due to a current situation. However, there is no measure of how the warning is provided and to what degree the warning should be applied.

Therefore, there exists the need for a better driver assistance system.

SUMMARY OF THE INVENTION

The present invention comprises a driver assistance device having one or more of the features recited in the appended claims and/or one or more of the following features, which alone or in any combination may comprise patentable subject matter:

The objective of the invention is to provide an advanced driver assistance system (ADAS) with retrieval of ideal feedback to be provided in case of a current critical situation.

Accordingly, in an embodiment of the invention, there is provided an advanced driver assistance system, wherein the system comprises; a forward looking first camera, adapted to identify activity and objects in short-range vicinity of the vehicle; a forward looking second camera, adapted to identify activity and objects in long-range vicinity of the vehicle; a ranging module, adapted to measure distance to objects in a straight path; a rear looking third camera, wherein the third camera is configured to monitor driver state; a storage, configured to store a plurality of vehicle state parameters; and a processor, configured to receive inputs from the first camera, the second camera, the ranging module, the third camera, and the storage, and wherein the processor is further configured to provide a feedback to the driver for a real-time situation, wherein the intensity of the feedback to the driver is varied based on the current vehicle state determined from the plurality of vehicle parameters.

According to another aspect of the invention, there is provided a method for real-time driver assistance. The method; gathering current external environment information through a plurality of forward looking cameras connected to a processor; capturing current driver state information through at least one rear looking camera, connected to the processor; generating, by the processor a combination of the current external environment and the current driver state information; fetching, by the processor, a current vehicle state from a storage module, wherein the storage module is configured to store a plurality of vehicle parameters obtained from an electronic control unit (ECU) of a vehicle; and varying, by the processor, intensity of a feedback to be provided to the driver wherein the variation is based on the current vehicle state based on the plurality of vehicle parameters.

Additional features and advantages are realized through the techniques of the present disclosure. Other embodiments and aspects of the present disclosure are described in detail herein and are considered a part of the present disclosure. For a better understanding of the present disclosure with advantages and features, refer to the description and to the drawings.

BRIEF DESCRIPTION OF THE ACCOMPANYING DRAWINGS

The foregoing summary, as well as the following detailed description of various embodiments, is better understood when read in conjunction with the drawings provided herein. For the purpose of illustration, there is shown in the drawings exemplary embodiments; however, the presently disclosed subject matter is not limited to the specific methods and instrumentalities disclosed.

DETAILED DESCRIPTION OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Hereinafter, preferred embodiments of the invention will be described in detail in reference to the accompanying drawings. It should be understood that like reference numbers are used to indicate like elements even in different drawings. Detailed descriptions of known functions and configurations that may unnecessarily obscure the aspect of the invention have been omitted.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
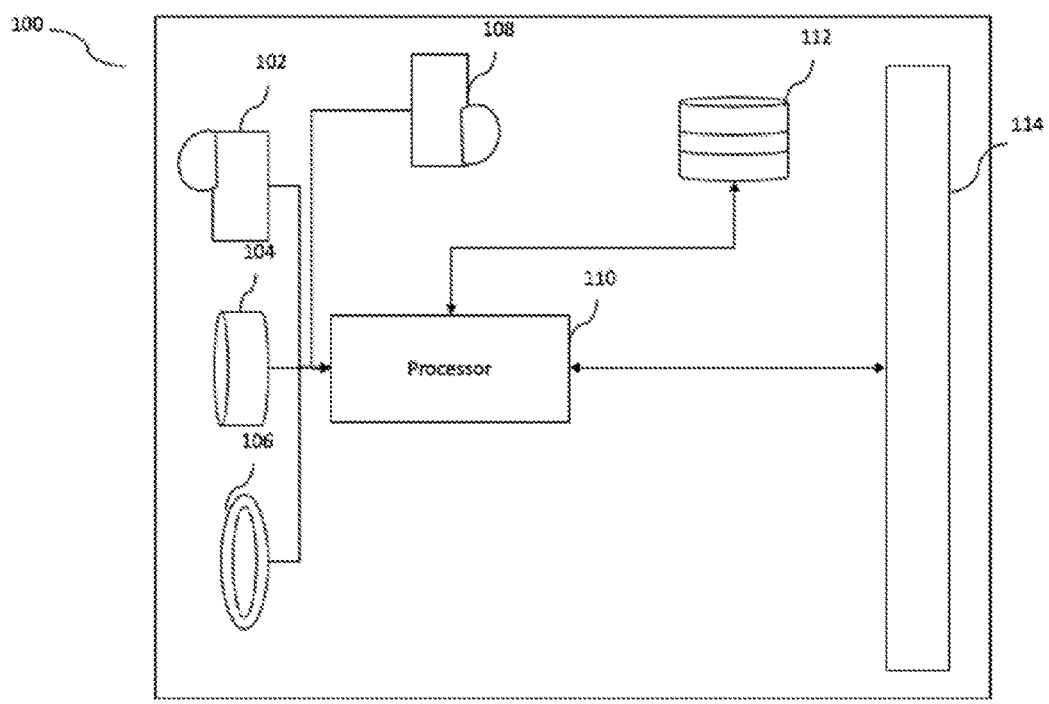
FIG. 1 is a block diagram illustrating an advanced driver assistance system, in accordance with an embodiment of the invention.

Referring now to FIG. 1, illustrates a block diagram illustrating an advanced driver assistance system (ADAS) 100. The system 100 is vehicle mounted. In an embodiment of the invention, the system 100 is windshield mounted or mounted on "A" pillar of the vehicle. Furthermore, in another embodiment of the invention the system 100 can be a single casing device that will be explained in detail in conjunction with FIGS. 3a and 3b. The system 100 includes a forward looking first camera 102. The forward-looking first camera 102, in an embodiment of the invention, can be a twin lens stereo camera. The first camera 102 is adapted to identify activity and objects that are within the close-range vicinity of the vehicle on which it is mounted.

System 100 further includes, a forward-looking second camera 104. The second camera 104 is a long range narrow field camera that identifies activity and objects in long-range vicinity of the vehicle on which system 100 has been mounted. Furthermore, the system 100, includes a ranging module 106. The ranging module 106 identifies and determines distance of objects lying in front of the vehicle. The ranging module 106, in an embodiment of the invention, is a Light Detection and Ranging (LIDAR) module based on LIDAR method. As already known in the art, LIDAR is a device distance to a target by illuminating that target with a laser light. For this purpose, LIDAR includes a transmitter to transmit laser light and a receiver to receive the reflected laser light.

Still referring to FIG. 1, the system 100 includes a rear-looking third camera 108. The third camera 108 helps in identifying driver profile and monitor driver's state. Third camera 108 can identify the driver whether it's an old person, a woman, a young boy, etc. Also, the camera 108 has ability to identify various kinds of reactions of the driver. Whether the driver is happy, angry, sad, worried, tensed etc. The camera 108 is also equipped with features to identify whether driver is attentive or not, is the driver sleepy, or looking at phone etc. Hence, the third camera 108 is equipped to monitor driver state.

System 100, further includes a processor 110, to which are connected the first camera 102, the second camera 104, the ranging module 106 and the third camera 108. Processor 110, takes inputs from all the three cameras and processes the information thus gathered. The information gathered from first camera 102, the second camera 104 and the ranging module 106 provides external environment information of the vehicle on which the system 100 is mounted. The processor 110, also takes input from the third camera 108 that gives the processor 110 information about the driver state and driver's profile. The processor 110 categorizes information into external and driver state information. Then a combination of the two is made and stored in a memory 112. Memory 112, also stores multiple vehicle state parameters that provide information about vehicle's current state. The memory 112 is also connected to an electronic control unit (ECU) (not shown in the figure) that collects vehicle state parameters through controller area network (CAN) bus of the vehicle. in an embodiment of the invention, the vehicle parameters are one or a combination of current brake shoe status, engine throughput, driving angle, steering status, or clutch status. Also, the vehicle parameters are continuously stored to the memory 112. The memory 112 can either be a locally placed or a remotely placed memory. Hence, the processor 110 is either connected through wired connection or through wireless communication protocol to the memory 112. In other embodiments of the invention, the processor 110 takes the vehicle state parameters information directly from an on-board diagnostic system within the vehicle.

Still referring to FIG. 1, the processor 110, after analyzing current external environment input and current driver state, identifies a threat based on the combination of current information or even based on individual information. Hence, the processor 110 queries the memory 112 for a current vehicle state based on the stored multiple vehicle parameters. Hence, based on the current vehicle state, a decision is taken by the processor 110. The processor 110, decides intensity level of feedback or warning required to be presented to driver of the vehicle. Feedback module can either give a visual warning to the driver, a haptic warning or an audio warning to the driver.

Figure 2:
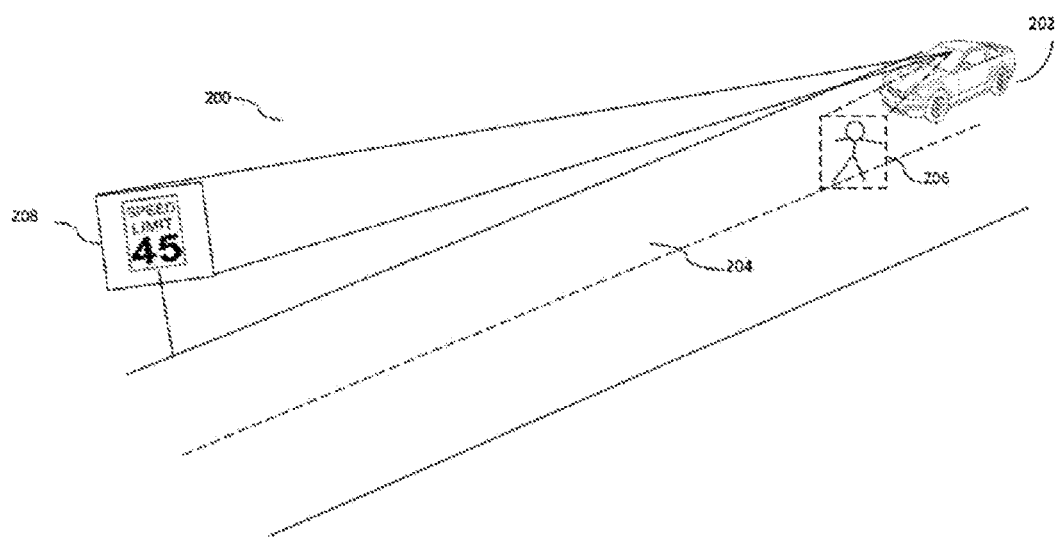
FIG. 2 is a line diagram illustrating an environment for functioning of the driver assistance system, in accordance with an embodiment of the invention.

Now referring to FIG. 2, a line illustrating an environment 200 where present invention is expected to work, in accordance with an embodiment of the invention. The environment 200 includes a road 204 on which is being driven a vehicle 202, wherein the vehicle 202 includes the first camera 102, the second camera 104 and the ranging module 106 mounted within the vehicle 202, preferably on windshield of the vehicle 202. There is also mounted the third camera 108 that is rear-looking and monitors driver state.

The first camera 102, is adapted to capture activity or objects like pedestrian 206 on the road 204 that is in close range vicinity. The first camera 102 does this in real-time. However, it is to be appreciated that the first camera 102 works in low speed ranges like 0-120 mph. The second camera 104, is adapted to capture objects or activity in long-range vicinity of the vehicle 202 like a speed sign 208 as shown in the environment 200. Also, the ranging module 106, determines distance to the speed sign 208 in real-time and time to warn the driver of the vehicle 202 is calculated. The warning to the driver is effected using a feedback module 114. The feedback module 114 takes inputs from the processor 110 (to be explained in detail in conjunction with FIG. 4) and provides feedback to the driver. Feedback can be an audio warning, a visual warning, an audio-visual warning, a haptic feedback like vibration etc.

Figure 3A:
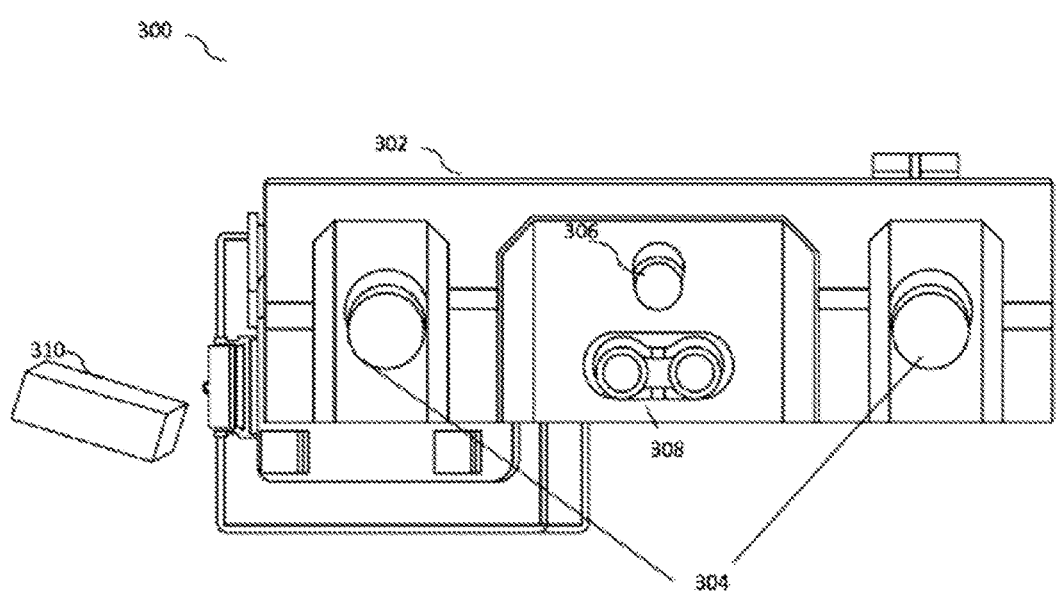
FIG. 3a is a line diagram illustrating front view of an advanced driver assistance system, in accordance with an embodiment of the invention.

Now referring to FIG. 3a, a line diagram illustrating front view of an advanced driver assistance system (ADAS) 300, in accordance with an embodiment of the invention. The ADAS 300 includes a single housing unit 302. In an embodiment of the invention, the single housing unit 302 is made up of anyone or a combination of a plastic, a fiber, a metal, etc. Single housing unit 302 houses a plurality of camera modules. The camera modules include a first camera 304 that is, in an embodiment, a stereo camera and hence is a twin lens camera adapted to capture activity and identify objects in close-range vicinity of the vehicle. The first camera 304 is adapted to function efficiently in low speed ranges of the vehicle that is in a range of 1-20 mph. Further, the ADAS 300 includes a second camera 306. The second camera 306 can be a long-range, narrow field camera adapted to identify activity and objects in long-range vicinity of the vehicle. The second camera 306 functions efficiently at higher speed that is in speed more than 20 mph.

Still referring to FIG. 3a, the ADAS 300 further includes a ranging module 308. The ranging module 308 is a Light and Detection Ranging (LIDAR) module. The ranging module 308 determines distance to the objects in front of the vehicle to which ADAS 300 is mounted. For this, the ranging module includes a laser emitter and a laser receiver. The emitter, emits laser waves which when reflects from the object is received by the receiver and hence calculates the distance to that object. In this way, the ranging module keeps in check what all objects are in-front and what is a safe distance from such objects. The ADAS 300 may have a control unit 310 that may be placed on dashboard of the vehicle whereas ADAS 300 might be mounted on windshield of the vehicle. All data is although captured by ADAS 300 however, processing might take place within the control unit 310 that might also control feedback input to the driver.

Figure 3B:
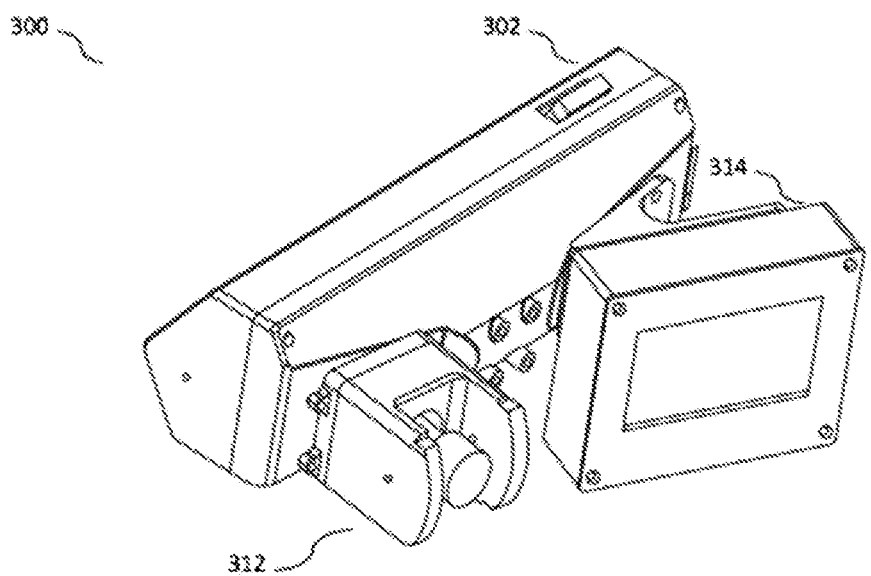
FIG. 3b is a line diagram illustrating rear view of an advanced driver assistance system, in accordance with an embodiment of the invention.

Now referring to FIG. 3b, a line diagram illustrating rear view of the ADAS 300. As indicated above, the ADAS 300 includes the single housing unit 302. At the rear side of the ADAS 300 is attached a driver state monitoring (DSM) device 312. The DSM device 312 is adapted to monitor driver state. The driver state may include driver profiling like driver age, driver sex, driving behavior. Also, driver monitoring may include emotions like sad, happy, angry, drowsy, sleepy, tired, anxious etc. There is also attached a warning device 302 on rear-side of the ADAS 300. The warning device 302 can be either a display device for a visual warning, or can give an audio-visual warning, an audio warning alone or can be attached to the control unit 310 which in turn is connected to an electronic control unit (ECU) of the vehicle (not shown in figure) for a haptic warning provided to driver through steering of the vehicle 202. The DSM module 312 also captures reaction of the driver to feedback given in some situations and this information is stored in the memory 112.

Figure 4:
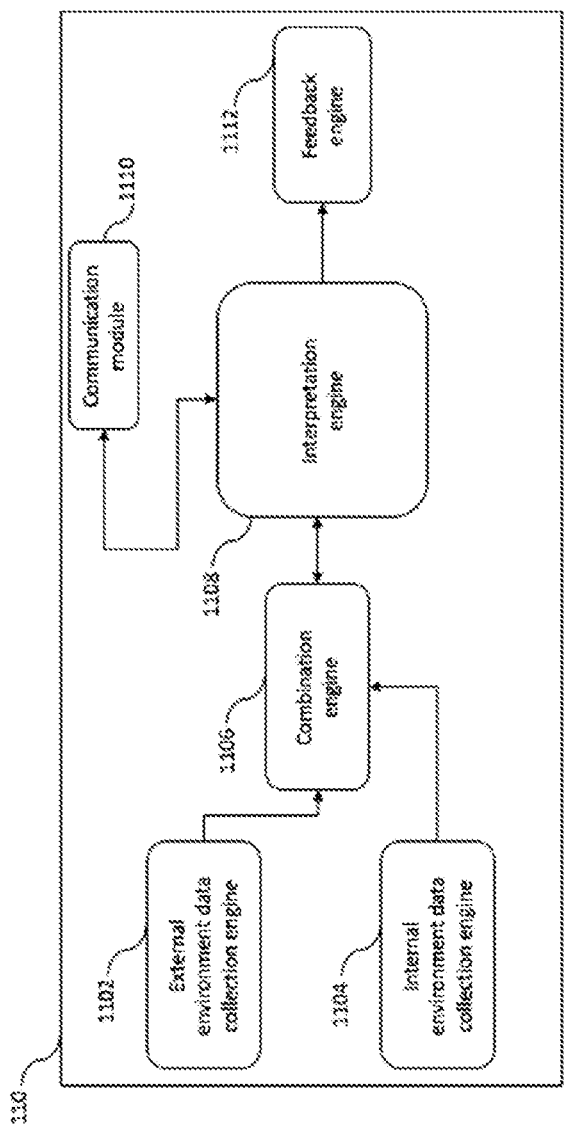
FIG. 4 is a block diagram illustrating a processor module, in accordance to an embodiment of the invention.

Now referring to FIG. 4 illustrating internals of the processor 110, in accordance with an embodiment of the invention. The processor 110 is either placed within the ADAS 300 or can be placed in the control unit 310. The processor 110 includes an external environment data collection engine 1102. This external environment data collection engine takes inputs from the first camera 102, the second camera 104, the ranging module 106 and combines the information to form external environment data. The processor 110 also includes an internal environment data collection engine 1104, that is adapted to take input from the third camera 108 that identifies driver state. Processor 110 further includes a combination engine 1106 that takes its input from the external environment data collection engine 1102 and the internal environment data collection engine 1104 and combines this information to form a current situation combination. The current situation combination is then sent to an interpretation engine 1108. The interpretation engine 1108 then determines whether it is a critical situation or not. Critical situation, to a person ordinarily skilled in the art would appreciate, will be a situation that requires feedback to the driver like, speed limit in approaching road is 45 mph however, driver is drowsy or there is a pedestrian running to cross the road while driver is fiddling with his mobile. Such a situation is a critical situation. Hence, the interpretation engine 1108 identifies such situation from the current situation combination. After fetching the critical situation from the current situation combination, the interpretation engine 1108 then initiates a communication module 1110 that connects with the memory 112 to fetch a current vehicle state from the multiple vehicle parameters stored within the memory 112. If the current vehicle state is available, the interpretation engine 1108 determines at what state is the vehicle is in. Based on the current vehicle state, the interpretation engine 1108 decides (details of this will be explained in conjunction with FIG. 6) intensity level of feedback that is to be provided to the driver facing the critical situation. This feedback information is then sent to feedback engine 1112 that gives the feedback to the driver.

Figure 5:
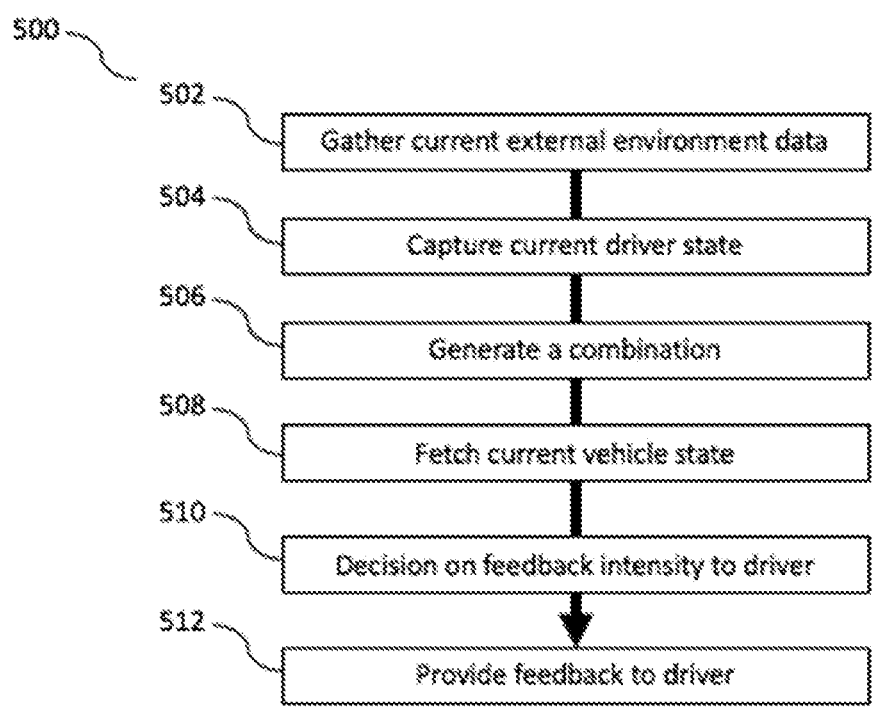
FIG. 5 is a flow chart illustrating a method of real-time driver assistance, in accordance to an embodiment of the invention.

Now referring to FIG. 5, a flow chart illustrating a method 500 for real-time driver assistance, in accordance to an embodiment of the invention. The method 500 analyzes current situation in and around the vehicle and the driver state and provides feedback to the driver by analyzing current vehicle state based on multiple vehicle parameters. The method 500 starts at step 502 at which current external environment data is gathered using the ADAS 300. The current external environment data, as already explained above, is collected using the first camera 304, the second camera 306 and the ranging module 308. Further, at step 504, driver's current state is captured. Now moving at step 506, a current combination situation is generated using the external environment and the driver current state. Further, at step 508, the ADAS 300 fetches from the memory 112, a current or most recent vehicle state parameters. The vehicle state parameters are collected by the ECU of the vehicle and stored within the memory 112 or the ADAS 100 can connect with the OBD system of the vehicle to directly collect the vehicle state parameters. At step 510, ADAS 300 determines what degree of feedback is to be given for the current vehicle state. At step 512, feedback is provided to the driver. The feedback can be either audio, visual, audio-visual, or haptic.

Figure 6:
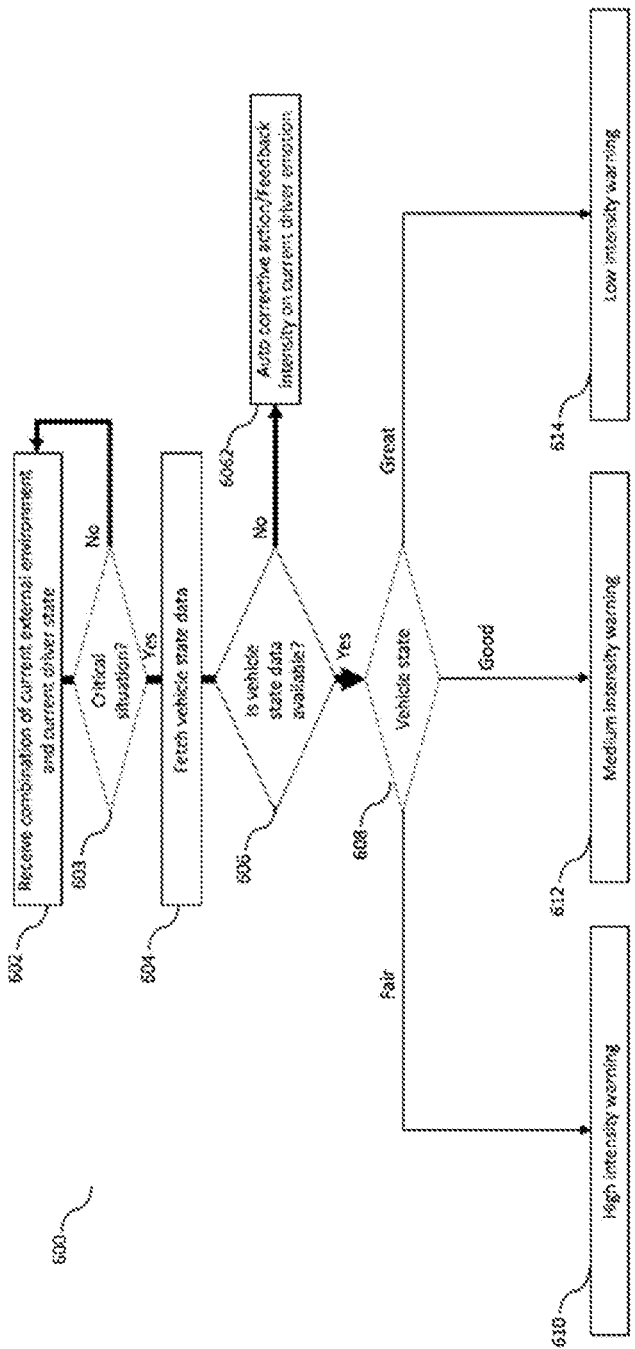
FIG. 6 is a flow chart illustrating a method of varying feedback, in accordance to an embodiment of the invention.

Now referring to FIG. 6, a flow chart illustrating a method 600 of varying feedback in real-time, in accordance to an embodiment of the invention. The method 600 is carried out within the interpretation engine 1108 of the processor 110. The method 600 starts at step 602, wherein the interpretation engine receives current combination situation that is a combination of current external environment and current driver state. At step 603, the interpretation engine 1108, identifies if it is a critical situation or not that has been described above in conjunction with FIG. 4. If the situation is not critical, the process is again started from step 602. However, in case the situation has been recognized as critical, the interpretation engine 1108, at step 604, fetches vehicle state data that includes vehicle state parameters. The interpretation engine 1108, initiates the communication module 1110 to communicate with the memory 112. The memory 112 as described earlier, stores multiple vehicle state parameters. Further, at step 606, it is determined, whether current vehicle state parameters are available in the memory 112 or not. If current vehicle state parameters are not available, at step 6062, the ADAS 300 provides a feedback of pre-determined intensity. Or the ADAS 300 will provide feedback intensity based on the last recorded vehicle state parameters. It is to be noted that ADAS 300, in other embodiments of the invention, may use service information from the OBD of the vehicle 202. ADAS 300 also, stores the reaction of the driver to such feedback and uses it for its own learning i.e. adaptive or self-learning. However, if the interpretation engine 1108, finds current vehicle state parameters, then at step 608, the interpretation engine 1108 analyzes the current vehicle state parameters and analyzes current vehicle state based on the current vehicle state parameters. If the current state of the vehicle determined is fair, then at step 610, the interpretation engine determines intensity of feedback warning to the driver should be high. Whereas, if the current state of the vehicle determined is good, then at step 612, the intensity of the feedback is of medium level. However, in case, the current vehicle state determined by the interpretation engine is great, only a low intensity feedback warning is provided to the vehicle. It should be appreciated by a person ordinarily skilled in the art that the vehicle state categories presented here are exemplary and there may be other categories of how so many numbers as desired. However, for ease sake, the same has been reduced to only three in the description.

Figure 7:
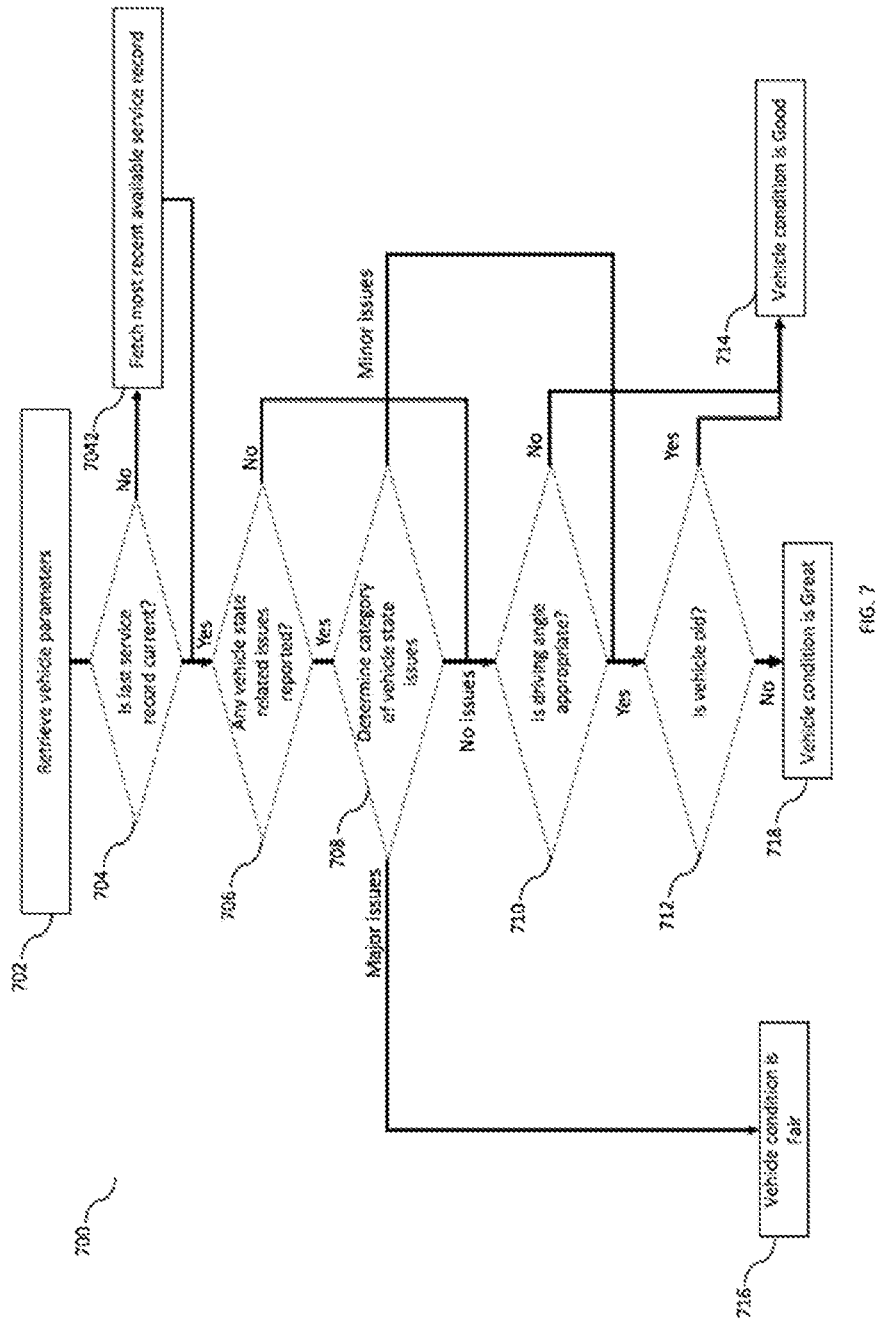
FIG. 7 is a flow chart illustrating a method of classifying vehicle condition using various vehicle parameters, in accordance to an embodiment of the invention.

Now referring to FIG. 7, illustrating a flow chart depicting an exemplary method 700 to determine vehicle condition based on vehicle parameters, in accordance with an embodiment of the invention. The figure depicts an exemplary method only and it should not be taken to limit the scope of the invention. As will be appreciated by a person having ordinary skill in the art, there may be other ways of categorizing vehicle condition by mixing the vehicle parameters in a different manner as well.

The method 700, starts at step 702, wherein the interpretation engine 1108 retrieves the vehicle state parameters. As discussed earlier, the vehicle state parameters may be either stored in a memory 112 or the interpretation engine 1108 communicates directly with the OBD of the vehicle 202. In an embodiment of the invention however, not limiting to the scope of the invention, the vehicle parameters can be last service record etc. It is to be appreciated that there might be other vehicle parameters that might be used. Further, at step 704, it is to be determined whether the last service record was of a nearby date or not. If the service record is not of a nearby date to current date, then at step 7042, the interpretation engine 1108 will fetch the most recent available service record. However, in case the service record is a recent one i.e. close to current date then at step 706, the interpretation engine uses the service record and determines if there were any issues reported in the service record. If there were no issues reported, the method 700 directly jumps to step 710. However, if the service record included issues reported, then at step 708, the category of the reported issues is determined. Now, at step 708, if the issues reported are major for e.g. problem with engine throughput, brake shoe condition not good, clutch plate condition not good, or gear condition not good, then the interpretation engine 1108 reports vehicle condition as "Fair" at step 716. If the issues are not directly related to driving or do not affect the driving of the vehicle 202, then the method 700 jumps directly to step 712. If no issues are reported, method 700 moves in series to step 710. At step 710, the driving angle of the vehicle 202 is determined. In case, the driving angle of the vehicle is appropriate then the method 700 moves sequentially to step 712. However, in case the driving angle is not appropriate condition of the vehicle 202 is classified as "Good" at step 714. Now at step 712, the interpretation engine 1108, determines the age of the vehicle. If the vehicle is old that is more than 6 years old, then the vehicle 202 is classified to be in "Good" condition. However, if the vehicle 202 is a new vehicle, that is less than 6 years old, then at step 718, vehicle is classified as in "Great" condition.

Aspects of the present subject matter are described herein with reference to flowchart illustrations and/or block diagrams of methods and apparatus (systems) according to embodiments of the subject matter. It will be understood that each block of the flowchart illustrations and/or block diagrams, and combinations of blocks in the flowchart illustrations and/or block diagrams, can be implemented by computer readable program instructions.

While there has been shown, and described herein what are presently considered the preferred embodiments of the present disclosure, it will be apparent to those skilled in the art that various changes and modifications can be made therein without departing from the scope of the present disclosure as defined by the appended claims.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While certain embodiments have been described, these embodiments have been presented by way of example only, and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure. The accompanying claims and their equivalents are intended to cover such forms or modifications as would fall within the scope and spirit of the present disclosure.

What is claimed is:

1. An advanced driver assistance system, wherein the system comprises;
   a forward looking first camera, adapted to identify activity and objects in short-range vicinity of the vehicle;
   a forward looking second camera, adapted to identify activity and objects in long-range vicinity of the vehicle;
   a ranging module, adapted to measure distance to objects in a straight path;
   a rear looking third camera, wherein the third camera is configured to monitor driver state;
   a storage, configured to store a plurality of vehicle state parameters; and
   a processor, configured to receive inputs from the first camera, the second camera, the ranging module, the third camera, and the storage, and wherein the processor is further configured to provide a feedback to the driver for a real-time situation, wherein the intensity of the feedback to the driver is varied based on the current vehicle state determined from the plurality of vehicle parameters, wherein the plurality of vehicle parameters includes anyone or a combination of current brake shoe status, engine throughput, driving angle, steering status, or clutch status.

2. The system of claim 1, wherein the first camera is a stereo camera having a short focal length.

3. The system of claim 1, wherein the second camera is a long range narrow field camera having a long focal length.

4. The system of claim 1, wherein the ranging module is a is a light detection and ranging (LiDAR) unit.

5. The system of claim 1, wherein the third camera is a charge coupled device camera.

6. The system of claim 1, wherein the third camera monitors driver state by capturing eye gaze and facial expressions of the driver.

7. The system of claim 1, wherein the feedback is any one or a combination of an audio feedback, a visual feedback, or a haptic feedback.

8. The system of claim 1, wherein the ECU gathers the plurality of vehicle parameters through a controller area network (CAN) bus.

9. A real-time driver assistance method, comprising;
gathering current external environment information through a plurality of forward looking cameras connected to a processor;
capturing current driver state information through at least one rear looking camera, connected to the processor;
generating, by the processor a combination of the current external environment and the current driver state information;
fetching, by the processor, a current vehicle state from a storage module, wherein the storage module is configured to store a plurality of vehicle parameters obtained from an electronic control unit (ECU) of a vehicle; and
varying, by the processor, intensity of a feedback to be provided to the driver wherein the variation is based on the current vehicle state based on the plurality of vehicle parameters, wherein the plurality of vehicle parameters includes anyone or a combination of current brake shoe status, engine throughput, driving angle, steering status, or clutch status.

10. The real-time driver assistance method of claim 9, wherein the plurality of forward looking cameras includes anyone or a combination of a stereo camera, or a long range narrow field camera.

11. The real-time driver assistance method of claim 9 wherein the processor is connected to the storage module through a wireless communication protocol.

12. The real-time driver assistance method of claim 9, wherein the feedback is any one or a combination of an audio feedback, a visual feedback, or a haptic feedback.

13. The real-time driver assistance method of claim 9, wherein the intensity of feedback is a mild, a moderate or a severe.

14. The real-time driver assistance method of claim 9, wherein the ECU gathers the plurality of vehicle parameters through a controller area network (CAN) bus.

* * * * *

UNITED STATES PATENT AND TRADEMARK OFFICE
CERTIFICATE OF CORRECTION

PATENT NO. : 10,525,879 B2
APPLICATION NO. : 15/592670
DATED : January 7, 2020
INVENTOR(S) : Anuj Kapuria et al.

It is certified that error appears in the above-identified patent and that said Letters Patent is hereby corrected as shown below:

On the Title Page

Item (30), should read:
(30) Foreign Application Priority Data
March 10, 2017 (IN)........... 201711008494

Signed and Sealed this
Fifth Day of May, 2020

Andrei Iancu
*Director of the United States Patent and Trademark Office*